Nov. 4, 1924.  
F. S. FLOETER  
POT CHUCK  
Filed July 3, 1922  
1,514,580  
2 Sheets-Sheet 1

Frederich S. Floeter  
INVENTOR

Geo. B. Willcox  
ATTORNEY

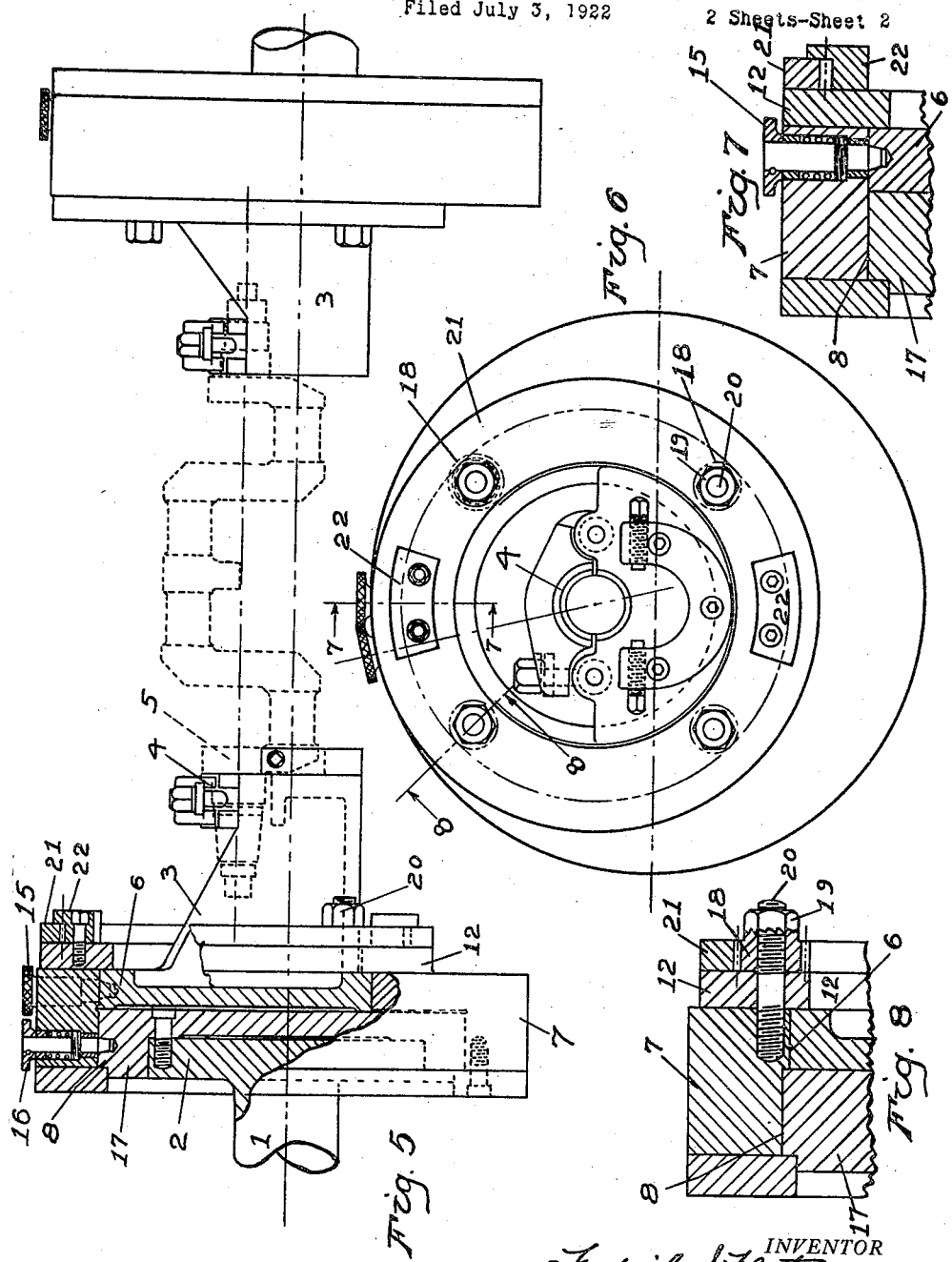

Patented Nov. 4, 1924.

1,514,580

UNITED STATES PATENT OFFICE.

FREDERICK S. FLOETER, OF SAGINAW, MICHIGAN, ASSIGNOR TO WICKES BROTHERS, OF SAGINAW, MICHIGAN, A CORPORATION OF MICHIGAN.

POT CHUCK.

Application filed July 3, 1922. Serial No. 572,751.

*To all whom it may concern:*

Be it known that I, FREDERICK S. FLOETER, a citizen of the United States, residing at Saginaw, in the county of Saginaw and State of Michigan, have invented certain new and useful Improvements in Pot Chucks; and I do hereby declare the following to be a full, clear, and exact description of the invention, such as will enable others skilled in the art to which it appertains to make and use the same.

This invention relates to pot chucks for turning lathes, grinding machines, boring machines and the like, and pertains more particularly to an improved construction and arrangement of pot chucks of the type adapted to hold crank shafts, eccentric shafts and similar work while the crank pins and other parts are being machined.

My improvement relates more specifically to a pot chuck, the axial center of which is adjustable radially with great precision, whereby the radial distance between the center line of the finished shaft and the center line of its crank pins may be fixed by adjustment of this fixture to suit different crank throws, and within very small limits of variation. When the pot chuck is so adjusted and set for any given crank throw, large numbers of crank shafts or other work may be quickly and accurately machined and ground to size without repeating the fine adjustment for the said radius dimension.

A further object of my improvement is to provide in a radially adjustable pot chuck such as above described, a means for quickly and accurately shifting the setting of the work with relation to the center line of the lathe by indexing, so that after one crank pin or a set of crank pins has been machined any other angularly disposed pin, or set of pins, may be shifted into a new indexed position for machining without altering the accurately gauged crank radius as originally set by the fine adjustment above mentioned.

With these and certain other objects in view which will appear later in the specification, my invention comprises the devices described and claimed and the equivalents thereof.

In the drawings, Fig. 1 is a part sectional side elevation of the means for accurately setting the radial distances between the center line of the crank shaft and the center line of the crank pin.

Figure 1:
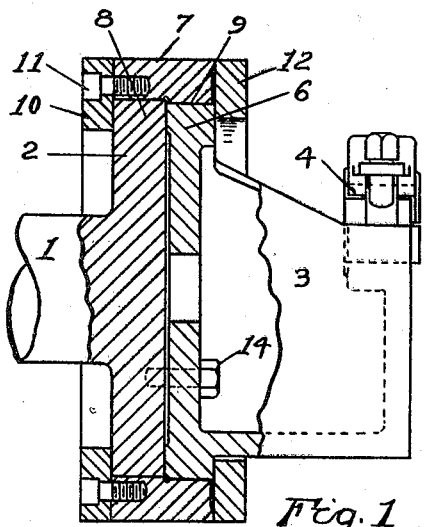

Fig. 5 is a part sectional side elevation of a head and tail pot chuck, the work, as an automobile crank shaft being shown by dotted lines. The embodiment shown in Fig. 5 includes the adjustment feature of Fig. 1, and in addition, shows means for re-indexing to a different position of the crank when it is desired to turn the other crank pins, which are angularly disposed with relation to the first set, without disturbing the finely adjusted crank throw.

Fig. 6 is a front view of the parts shown in Fig. 5.

Fig. 7 is an enlarged section on the line 7—7 of Fig. 6.

Fig. 8 is an enlarged section on the line 8—8 of Fig. 6.

1 indicates the usual pot chuck spindle carrying the disk 2, which in turn carries the pot chuck 3. The pot chuck as usual is provided with a bearing 4 to receive the end of the crank shaft or other work 5.

Referring to Fig. 5, it will be seen that the axis of the crank shaft is parallel with and radially distant from the axis of the pot chuck spindle by an amount equal to the desired throw of the finished crank. It is essential for the accurate machining of work such as automobile engine crank shafts, that means be provided in the turning lathe and grinding machine on which the crank shaft is formed, whereby the radial length or throw of the crank, may be quickly and very accurately adjusted, the adjustment required being usually within allowable limits, of one- or two-thousandths of an inch.

My improvement, therefore, provides a simple, yet strongly constructed radially adjustable device for the work-holding bearing of the chuck, which will now be described in detail.

The pot chuck 3 is formed with an accurately turned disk base 6, one face of which takes against the accurately machined face of disk 2 on spindle 1.

To increase or decrease the radial distance between the axes of the pot chuck spindle 1 and crank shaft bearing 4, it is only necessary to slide disk 6 radially upon the face of disk 2 and to provide means for clamping it in position.

Since the desired radial movement of adjustment is usually required to be made with great accuracy, I provide an adjusting ring 7, see Figs. 1 and 8, one end of which is bored, as at 8, to accurately fit the periphery of disk 2, as shown in Figs. 1 and 5. The other end of ring 7 is bored, as at 9, to receive and accurately fit the periphery of disk 6 which forms the base of pot chuck 3, the bores 8 and 9 being eccentric with respect to each other.

When ring 7 is rotated through part of a turn with respect to disks 2 and 6, the central axis of pot chuck 3 and the axis of spindle 1 may be made to coincide, or may be made to become relatively eccentric to increase the distance between the shaft axis and the crank pin axis of the finished work. Since a considerable amount of angular or indexing movement may be imparted to ring 7 to produce a very slight increase of eccentricity of chuck 3 with respect to spindle 1, the radial adjustment is obviously very accurate and sensitive, although the parts by which the adjustment is effected are heavy and strongly built.

Figure 2:
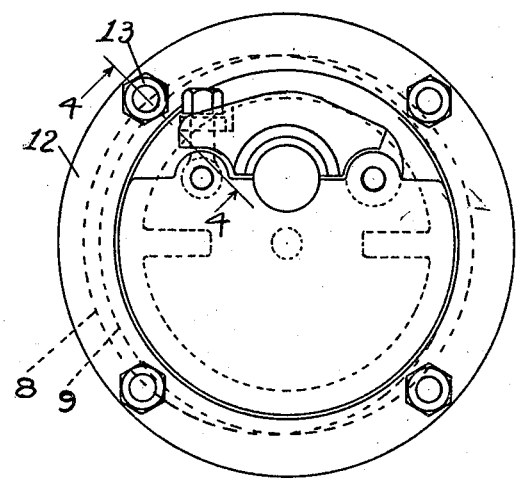
Fig. 2 is a front view of the parts shown in Fig. 1.
Figure 3:
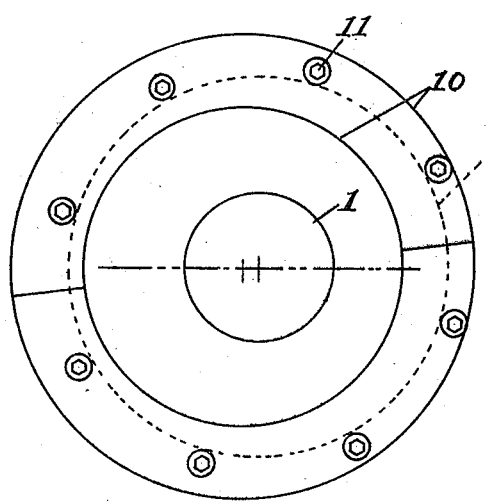
Fig. 3 is a rear view.
Figure 4:
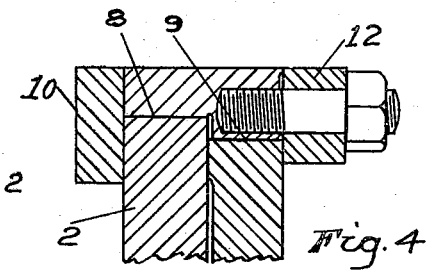
Fig. 4 is an enlarged sectional detail on the line 4—4 of Fig. 2.

The ring 7 may be rotatably mounted on disk 2 by an annular ring 10 secured in place by bolts 11, see Fig. 1. The disk base 6 may be held against the face of disk 2, while the adjustment is being made, by a similar annular ring 12, which may be bolted to ring 7 and thereby clamp disk 6 by means of set bolts 13, as shown in Fig. 2.

Since the eccentricity of the axis of the pot chuck bearing 4 with respect to the axis of spindle 1 is determined by the relative position of disk 6 with respect to disk 2, and since the radial displacement of these two disks with respect to each other is attained by rotary or indexing adjustment of the ring 7 having the two opposite eccentric bores 8 and 9, it is readily seen that the desired radial adjustment is attained in practice by merely rotating the ring 7 with respect to the disks 2 and 6 and then clamping them in place by means of the bolts 13.

Usually it is only necessary to make this radial adjustment once for any desired throw of work. The adjustment having once been accurately made for cranks of a specified throw, the pot chuck may be rigidly fixed to the disk 2 by a dowel or its equivalent 14, substantially as shown in Fig. 1, and no further adjustment will be required, until it is desired to again change the radius of throw of the finished work.

Instead of the dowel 14, a radial dowel pin may be employed. To lock disk 6 and ring 7 together, the spring-pressed dowel pin 15 may be employed, which passes radially through ring 7 and engages a recess in the periphery of ring 6, as shown in Fig. 7. There may be as many recesses in the periphery of ring 6 as there are desired indexing adjustments of the circumferential position of ring 7.

Frequently, after one set of crank pins has been turned or machined, it is desirable to machine other crank pins on the same shaft. These crank pins may be diametrically opposite the first set, or they may be angularly disposed thereto, as for example, at angles of ninety degrees, or sixty degrees around the crank circle.

This angular adjustment may be effected, as shown in Fig. 5, by means of a spring-pressed dowel pin 16, which may engage the angularly disposed recesses in the periphery of disk 2, or if desired, may engage similar recesses in the intermediate ring or filler 17 carried by disk 2, the purpose of the intermediate ring 17 being to permit one size of pot chuck to be applied to lathes having spindle disks 2 of various diameters, the filler 17 in effect increasing the diameter of disk 2, to fit the bore 8 of ring 7.

To increase the rapidity of making the radial adjustment, I provide means for quickly releasing the clamping action of ring 12.

The preferred arrangement is shown in Fig. 8, where 18 is a pinion fixed to, or formed integral with nut 19 and threaded on stud 20.

All of the pinions 18 are engaged by an internally threaded gear 21, Figs. 5 and 8, which is held in place by suitable lugs 22—see Figs. 6 and 7—secured to ring 12. Thus, turning any one of the bolts 19 will simultaneously turn all the others.

Having thus described my invention, what I claim and desire to secure by Letters Patent is:

1. In a machine of the class described, the combination with a pot chuck, a spindle, a disk on said spindle, a disk on said chuck, said disks set face to face, a revolvable ring surrounding said disks, said ring formed with two oppositely directed internal bores arranged eccentrically with respect to each other, said bores receiving respectively the rims of said chuck disk and spindle disk, said eccentric ring removable, whereby to adjust the radial distances between the axial centers of said spindle and the axial center of said chuck, for the purposes set forth.

2. In a machine of the class described, the combination with a pot chuck, a spindle, a disk on said spindle, a disk on said chuck, said disks set face to face and slidingly movable with respect to each other, a revolvable ring surrounding said disks, said ring formed with two oppositely directed internal bores arranged eccentrically with respect to each other, said bores receiving respectively the rims of said chuck disk and spindle disk, said eccentric ring revolvable, and means for releasably securing said disks together, for the purposes set forth.

In testimony whereof I affix my signature in presence of two witnesses.

FREDERICK S. FLOETER.

Witnesses:
 U. M. SCHMIDT,
 RICHARD E. SCHULZ.